Aug. 17, 1965   L. R. VAN STEENBURGH, JR   3,200,611
APPARATUS FOR MAKING ICE MEMBERS
Filed April 30, 1964   4 Sheets-Sheet 1

INVENTOR.
Leon R. Van Steenburgh, Jr.,
BY
Attys.

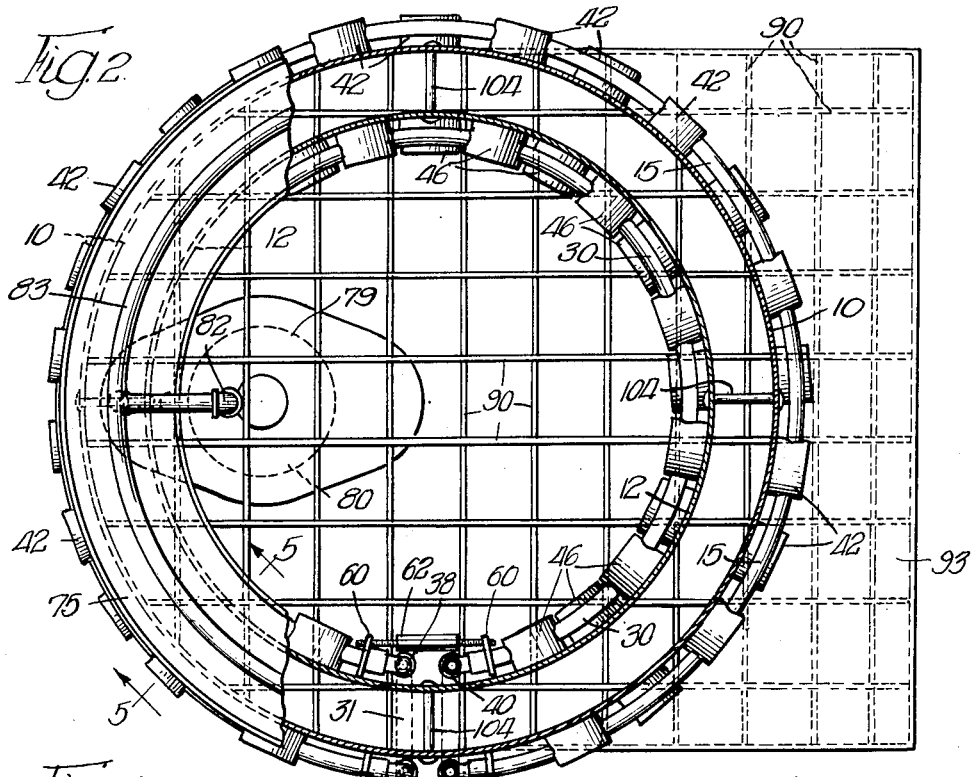
Fig. 2
Fig. 3
Fig. 4
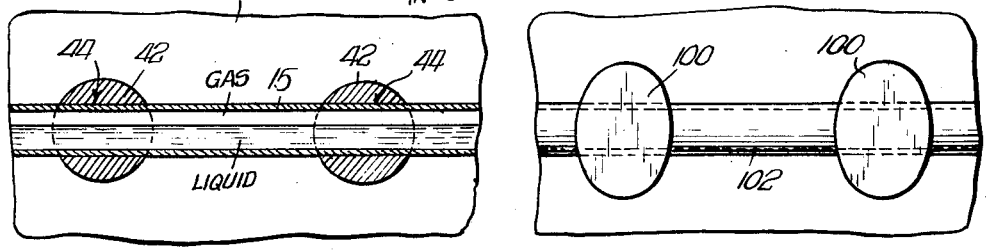
Fig. 5
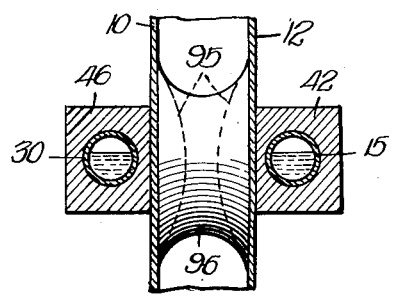
INVENTOR.
Leon R. Van Steenburgh, Jr.
BY

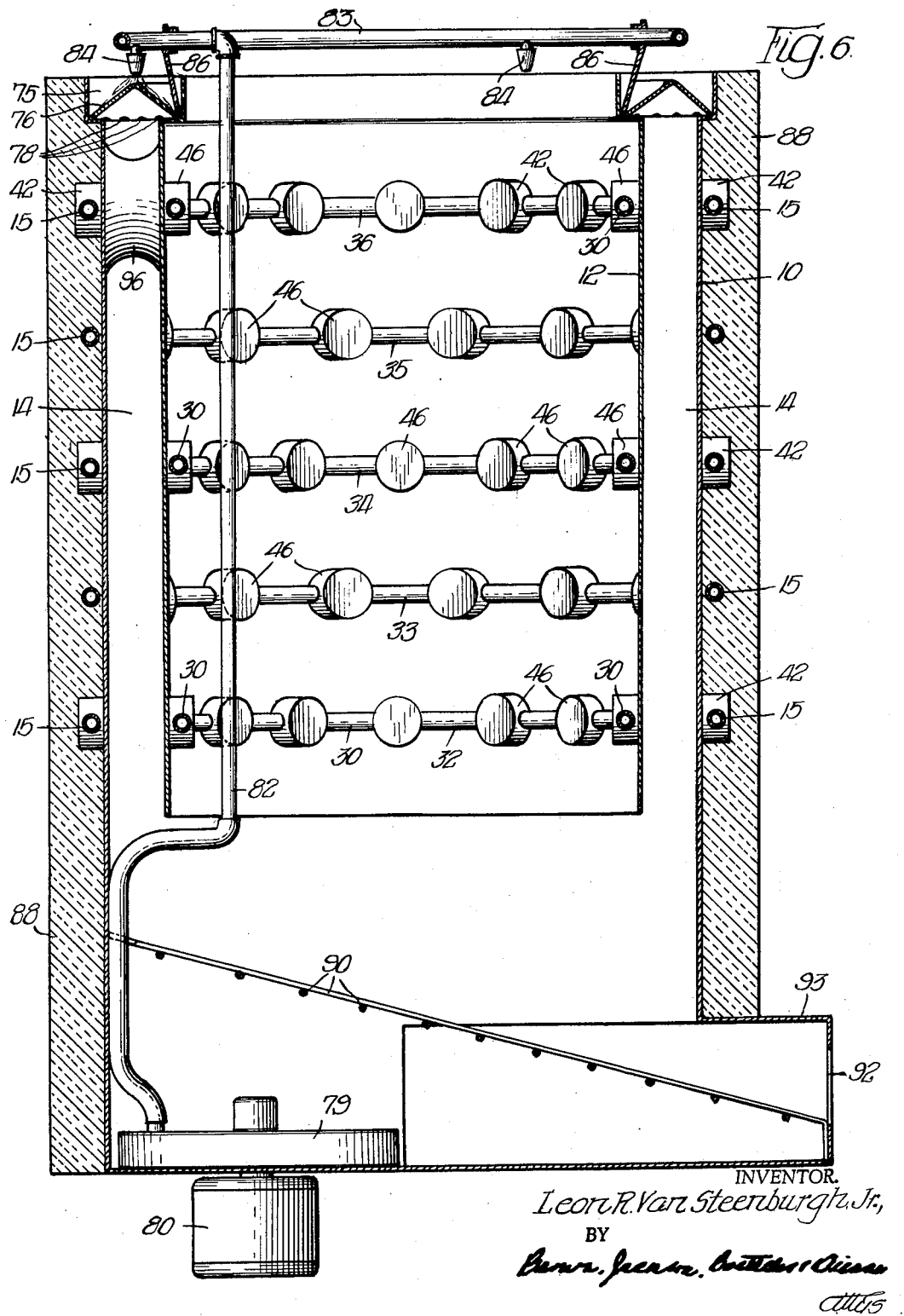

Aug. 17, 1965   L. R. VAN STEENBURGH, JR   3,200,611
APPARATUS FOR MAKING ICE MEMBERS
Filed April 30, 1964                4 Sheets-Sheet 4
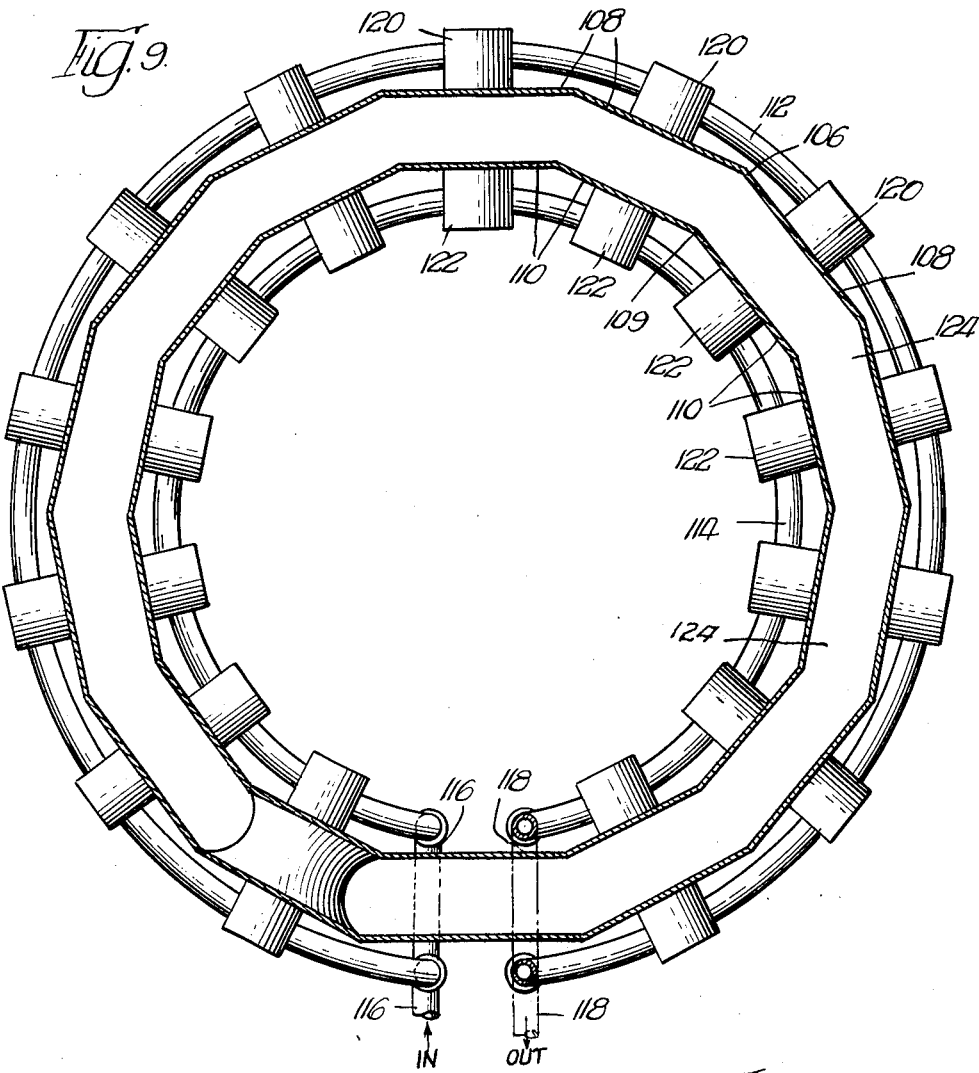
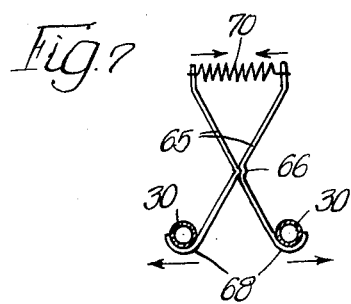
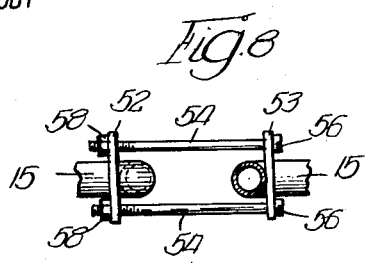
INVENTOR.
Leon R. Van Steenburgh, Jr.,
BY

United States Patent Office 3,200,611
Patented Aug. 17, 1965

3,200,611
APPARATUS FOR MAKING ICE MEMBERS
Leon R. Van Steenburgh, Jr., 511 Parkside Drive,
Rockford, Ill.
Filed Apr. 30, 1964, Ser. No. 363,731
11 Claims. (Cl. 62—298)

This invention relates to apparatus for making ice members, and is particularly directed to an improved ice member making apparatus for producing ice members of great clarity and purity at low cost and at a faster rate.

The present application is directed to improvements over my earlier application, Serial No. 336,414, filed January 8, 1964.

As pointed out in my earlier application, it has previously been proposed to provide ice member making apparatus having walls with surfaces arranged to face each other with cooling buttons or members soldered or welded to the outer surfaces of the metal walls, or having portions projecting through openings in the metal walls and riveted over at their inner ends. With the cooling buttons soldered or welded to the metal walls, the buttons separate or break loose from the walls due to expansion and contraction in changing from the freezing cycle to the releasing cycle; and also due to moisture getting into pockets between the buttons and the metal walls. Where the buttons are riveted to the metal walls bacteria accumulates between the surfaces of the metal walls and the inner ends of the buttons, and other problems are presented.

In my earlier application the ice member making apparatus has one wall and the cooling buttons are clamped to the outer surface of the wall, for example, by spring means, or mechanical clamping means, and without soldering, welding, or otherwise attaching the cooling buttons to the wall. This avoids the problem of the buttons separating or breaking loose from the wall due to expansion and contraction in changing from the freezing cycle to the releasing cycle; and also due to moisture getting into pockets between the buttons and the metal walls.

One of the main objects of the present invention is the provision of an improved ice member making apparatus which will overcome the problems and difficulties encountered with previous forms of apparatus for making ice members.

Another object is to provide an improved ice member making apparatus having a pair of walls providing a pair of surfaces facing each other, said surfaces being wetted by circulating water, cooling buttons cooperating with the other surfaces of each of said walls for refrigerating a plurality of areas of each of said surfaces to cause ice to form on said surfaces at said areas, and means for clamping the cooling buttons against said other surfaces of each of said walls without attachment of said cooling buttons to said walls.

Another object is to provide ice member making apparatus in which the cooling buttons are clamped to the other surfaces of the walls by spring means, or mechanical clamping means, without attachment of the cooling buttons to the walls, and without the problems previously presented where the cooling buttons are attached to the walls.

Another object is to provide ice member making apparatus in which the surfaces on which the ice is formed are provided by concentric generally tubular walls spaced apart an amount to form the ice members therebetween.

Another object is to provide an improved apparatus for making ice members comprising, a vertical generally cylindrical tubular outer wall, a vertical generally cylindrical tubular inner wall spaced inwardly from the outer wall, a refrigerating system including evaporator tube means encircling the outer surface of the outer wall and the inner surface of the inner wall, cooling members joined to the evaporator tube means at separated positions, means for wetting the opposing surfaces of the tubular walls, and means for contracting the evaporator tube means encircling the outer wall and for expanding the evaporator tube within the inner wall to press the cooling members into contact with the outer surface of the outer wall and into contact with the inner surface of the inner wall without attachment to said walls to supply a cooling effect to said buttons and thereby to separated aligned spots along the tubular walls.

Another object is to provide an annular trough at the upper end of the space between the generally tubular walls, and a spreader plate in said trough for receiving water from spouts opening downwardly from an overlying water tube, and from which trough the water circulates downwardly over the generally tubular surfaces which face each other for formation of the ice members thereon.

Another object is to provide generally tubular walls of polygonal form having parallel straight wall portions between which the ice members are formed.

Another object is to provide apparatus for making ice members which is well insulated from entering heat by insulation around the outer side of the outer generally tubular wall and about the evaporator and cooling buttons on the outer side of said wall.

Further features, advantages and adaptations of the invention will be apparent from the following detailed description taken in connection with the accompanying drawings, it being understood that the invention is limited only within the scope of the appended claims and not to the particular embodiments selected for illustration.

In the drawings:

FIGURE 2 is a top plan view partially in section of the apparatus shown in FIGURE 1, taken along the line 2—2 of FIGURE 1;

FIGURE 3 is a fragmentary vertical sectional view through one of the turns of the evaporator tube showing cooling buttons of one form attached to the evaporator tube;

FIGURE 4 is a fragmentary view showing a portion of one of the turns of the evaporator tube and cooling buttons of different form thereon;

FIGURE 5 is a sectional view taken along the line 5—5 of FIGURE 2;

FIGURE 6 is a vertical axial sectional view through the apparatus shown in FIGURE 1 and showing the insulation covering the outer surface of the outer wall and the turns of the outer portion of the evaporator tube and the cooling buttons thereon;

FIGURE 7 is a detail view partially in section showing one form of spring arrangement for expanding the inner turn of the evaporator tube means and pressing the cooling buttons thereon into cooperation with the inner surface of the inner wall of the apparatus;

Figure 1:
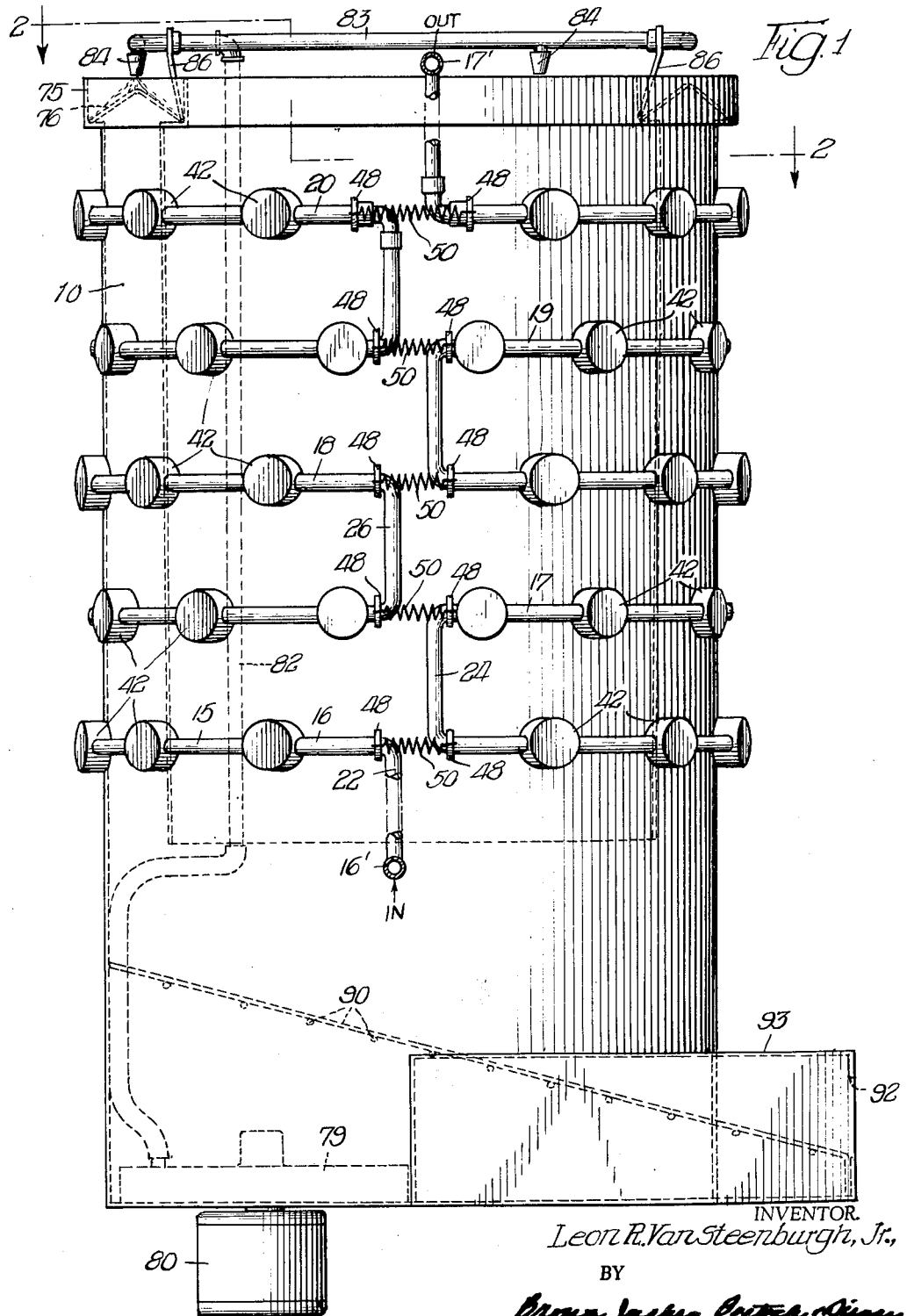
FIGURE 1 is a side elevational view of one form of apparatus embodying the present invention with the insulation covering the outer surface of the outer wall and the evaporator tube and cooling buttons omitted.

FIGURE 8 is a detailed view showing mechanical clamping means instead of the spring means of FIGURES 1 and 2 for contracting the turns of the outer evaporator tube to clamp the cooling buttons or members thereon to the outer surface of the outer wall; and FIGURE 9 is a horizontal sectional view of another form of apparatus embodying the present invention in which the tubular walls are of polygonal form providing flat portions between which the ice members are formed.

The form of apparatus, as shown in FIGURES 1, 2, 3, 4, 5 and 6, comprises a vertical cylindrical outer wall 10, and a concentric vertical generally cylindrical inner wall 12 spaced inwardly from the outer wall 10 to form an annular space 14 between the walls within which the ice members are formed. The walls 10 and 12 are preferably formed of stainless steel because of its cleanliness and its low conductivity of heat.

An outer evaporator tube 15 having an inlet at the bottom at 16' and an outlet at the top at 17' has a plurality of turns or convolutions 16, 17, 18, 19 and 20 of generally circular form surrounding the circular or cylindrical outer surface of the wall 10 and spaced therefrom. From the inlet 16 tube 15 extends upwardly at 22 and horizontally surrounds the outer wall 10 along the turn 16 to position spaced from the inlet to the convolution 16. The turn 16 at the end opposite the inlet end is turned upwardly at 24 and horizontally surrounds the wall 10 along the next turn 17 to position spaced from the inlet of the turn 17 where the tube is again turned upwardly at 26 to the adjacent end of the next turn 18. The foregoing is repeated throughout the remaining turns 19 and 20 of the tube 15.

An inner evaporator tube 30 has an inlet at the bottom connected to the inlet 16' as shown at 31 in FIGURE 2, and an outlet at the top connected, for example, to the outlet 17'. The inner evaporator tube 30 has a plurality of turns or convolutions 32, 33, 34, 35 and 36, one for each of the turns 16, 17, 18, 19 and 20 of the outer evaporator tube 15. The turns of the inner evaporator tube 30 are horizontally aligned with the turns of the outer evaporator tube, and the upwardly turned portions 38 and 40 of the inner evaporator tube as shown in FIGURE 2 are similar to the upwardly turned portions 22, 24 and 26 of the outer evaporator tube 15 as shown in FIGURE 1. The turns of the inner evaporator tube 30 are of generally circular form and surround the inner surface of the inner wall 12 and are spaced therefrom.

The number of turns of the outer and inner evaporator tubes 15 and 30 may vary as desired depending upon the number of turns desired about the outer wall 10 and about the inner wall 12. Nine or ten turns about the outer wall 10 and corresponding nine or ten turns about the inner wall 12 are contemplated in some forms of the apparatus and a lesser number of turns are contemplated where a reduction in the height of the apparatus is desired.

Cooling buttons 42 are fixed on each turn of the outer evaporator tube 15, for example, by treating the outer sides of the tube 15 with acid and molding the buttons 42 thereon. The cooling buttons 42 are preferably formed of lead or copper and thus adhere at 44, as shown in FIGURE 3, to the copper tube 15. In one form of the invention the buttons 42 are spaced apart a distance of about two inches horizontally along the tube turns 16, 17, 18, 19 and 20, and the tube turns are spaced apart vertically a distance of about two inches.

The buttons 42 on the lower tube turn 16 are staggered with respect to the buttons on the tube turn 17 and the buttons on the tube turn 17 are positioned between the buttons 42 on the tube turn 16.

The buttons 42 on the third tube turn 18 are staggered with respect to the buttons on the tube turn 17 and are disposed between the buttons on the tube turn 17. This arrangement of the buttons 42 is repeated throughout all of the tube turns 16, 17, 18, 19 and 20. The inner ends of the cooling buttons 42 are clamped to the outer cylindrical surface of the wall 10, but are not soldered, welded, or otherwise secured to this wall 10. The inner ends of the buttons 42 may be concave to conform with the cylindrical outer surface of the wall 10 for full contact with the outer surface of said wall 10 over their entire inner ends.

Inner cooling buttons 46, similar to the outer cooling buttons 42, are fixed on each of the turns of the inner evaporator tube 30 as described in connection with the outer cooling buttons 42. The cooling buttons 46 are also preferably formed of lead or copper, and adhere similarly to the copper inner evaporator tube 30. The buttons 46 are staggered on the respective turns of the tube 30, as described in connection with the outer buttons 42, so that one of the inner buttons 46 will be accurately aligned with each of the outer buttons 42.

If desired, the cooling buttons 42 and 46 may be formed of copper as integral parts of the turns of the copper evaporator tubes 15 and 30. The buttons 42 and 46 would thus be hollow so that the refrigerant supplied to the evaporator tubes 15 and 30 passes through the interiors of the hollow buttons, each of which has a wall at its inner end contacting the outer surface of the wall 10 and the inner surface of the wall 12.

Each of the buttons 42 completely surrounds the tube 15, and each of the buttons 46 completely surrounds the tube 30. This gives a higher heat transfer.

In FIGURES 1 and 2 each of the spaced ends of each turn 16, 17, 18, 19 and 20 of the outer evaporator tube 15 has lugs or projections 48 secured to the spaced ends of the turns of the tube. Coiled contraction springs 50 are connected at opposite ends to the lugs or projections 48. The springs 50 contract the turns 16, 17, 18, 19 and 20 of the tube 15 and thus press the inner ends of the outer cooling buttons 14 yieldingly into contact with the outer surface of the wall 10.

FIGURE 8 shows one form of mechanical clamping means instead of the spring means of FIGURES 1 and 2, for contracting the turns 16, 17, 18, 19 and 20 of the tube 15 and thus pressing the inner ends of the cooling buttons 42 into contact with the outer surface of the wall 10 without attaching the buttons to this wall. This mechanical clamping means comprises lugs or projections 52 and 53 secured to the spaced ends of the turns of the tube. Screws 54 have heads 56 engaging one of the lugs or projections 52 or 53 and the shanks of these screws 54 pass through openings in the lugs or projections and have nuts 58 threaded thereon and coacting with the other lugs or projections 52, 53. This mechanical clamping means contracts the turns of the tube 15 and thus presses the cooling buttons 42 into with the outer surface of the wall 10 without attaching the cooling buttons to this wall.

In FIGURE 2 each of the spaced ends of the turns of the inner evaporator tube 30 has lugs or projections 60 secured thereto. A mechanical clamping member 62 cooperates with the lugs or projections 60 for expanding the turns of the tube 30 to press the outer ends of the cooling buttons 46 into contact with the inner surface of the wall 12. Turning or operation of the clamping member 62 in the opposite direction releases the buttons 42 from the inner surface of the wall 12.

FIGURE 7 shows one form of spring means, instead of the mechanical clamping means of FIGURE 2, for expanding the turns of the tube 30 to press the outer ends of the cooling buttons 46 into contact with the inner surface of the wall 12 without attaching the buttons 46 to this wall. This spring means comprises a pair of arms 65 pivoted together at 66. One end of each arm 65 cooperates at 68 with the spaced ends of each turn of the tube 30. A contraction spring 70 is connected between the opposite ends of each pair of arms 65 and acts to spread the ends 68 of the arms 65 and to spread the ends of each turn of the tube 30. With one such spring means for the ends of each turn of the tube 30 the tube turns 32, 33, 34, 35 and 36 are expanded by the springs 70 and the cooling buttons 46 are pressed into contact with the inner surface of the wall 12.

The formation of the evaporator or refrigeration tubes 15 and 30 about the outer surface of the wall 10 and about the inner surface of the wall 12 with the cooling buttons 42 and 46 clamped to the outer surface of the wall 10 and to the inner surface of the wall 12 allows the three dissimilar metals (stainless steel, lead and copper), or the two dissimilar metals (stainless steel and copper)

to expand and contract freely without harm to the equipment as where the cooling buttons are soldered, welded or otherwise secured to the walls between which the ice members are formed.

An annular trough is provided about the upper ends of the walls 10 and 12. An angular spreader plate or member 76 is disposed within the trough 75 with its angular portions extending downwardly and seated on the bottom of the trough 75. The trough 75 opens downwardly into the annular space 14 between the walls 10 and 12 around the lower ends of the angular portions of the member 76, or through openings 78 therein as shown in FIGURE 6.

Disposed within the bottom of the outer wall of the apparatus is a pump 79 operated by an electric motor 80. The pump 79 has a tube 82 extending upwardly through the interior of the inner wall 12 to an annular horizontal tube 83 overlying the trough 75. The tube 83 is supported by members 86 thereon which extend downwardly and seat at the bottom of the trough 75. The annular tube 83 has downwardly directed spouts 84 which discharge water delivered to the tube 83 by the pump 79 through the tube 82 downwardly upon the spreader member 76. This water enters the space 14 around the lower ends of the angular portions of the spreader member 76 or through the openings 78 and circulates downwardly over the surfaces of the walls 10 and 12 which face each other.

The wall 10 and the turns of the outer evaporator tube 15 and the cooling buttons 42 thereon are preferably insulated by an annular wall of insulation as shown at 88 in FIGURE 6. This insulation 88 is omitted from FIGURES 1 and 2 for purposes of clarity of the disclosure. The annular layer of insulation 88 covers the outer surface of the wall 10; and also the turns of the outer evaporator tube 15 and the cooling buttons 42. The insulation may, for example, be Styrofoam, or polyurethane insulation.

At the bottom of the interior of the wall 10 beneath all of the ice members formed on the surfaces of the walls 10 and 12 which face each other is an inclined open work metal screen 90 as shown in FIGURES 1, 2 and 6. The ice members upon being released from the surfaces of the walls 10 and 12 which face each other fall onto this screen 90 and the inclination of the screen 90 passes the ice members outwardly through an outlet opening 92 in a compartment 93 formed at the bottom of the wall 10. Any water will pass through the screen 90 and may be discharged as desired from the bottom of the apparatus.

The flow of refrigerant through the outer evaporator tube 15 and the inner evaporator 30 cools the buttons 42 on the tube 15 and the buttons 46 on the tube 30. This supplies the cooling effect to the surfaces of the walls 10 and 12 which face each other at the inner ends of the buttons 42 and the outer ends of the buttons 46. With the water circulating downwardly over the surfaces of the walls 10 and 12 which face each other disks of ice are formed on the facing surfaces of the walls 10 and 12 as shown, for example, in dotted lines at 95 in FIGURE 5. The two opposing disks 95 grow in size as the freezing continues, and finally join and continue to freeze until each pair of disks 95 forms one thick disk of ice as shown at 96 in FIGURE 5.

After the thick disks 96 have been completely formed, and before adjacent thick disks 96 join each other, flow from a motor compressor, for example, is directed through the outer and inner evaporator tubes 15 and 30 at a higher temperature to release the ice members 96 from the walls 10 and 12, for example, as disclosed in my earlier patent application, Serial No. 336,414, filed January 8, 1964. The released ice members 96 drop onto the screen 90 and are discharged through the opening 92. A solenoid valve may operate to shut off flow through the tubes 15 and 30 at a higher temperature and to set up flow to a condenser to supply refrigerant through the evaporator tubes 15 and 30 as more fully disclosed, for example, in my above set forth earlier patent application. This is the next freezing cycle which forms further ice members 96 on the surfaces of the walls 10 and 12 which face each other. The subsequent ice members 96 are released as previously explained.

The outer and inner cooling buttons 42 and 46 instead of being aligned may be staggered to form separate ice members on the walls 10 and 12 which ice members do not join each other as above described.

To facilitate the release of the ice members 96 from the surfaces of the walls 10 and 12 which face each other and the dropping of the released ice members 96 onto the screen 90, the inner wall 12 may taper downwardly to a smaller diameter at the bottom thereof. A tapering of the inner wall 12 to a diameter about $\frac{1}{16}$ of an inch less than the diameter of the top of the wall 12 is sufficient for this purpose, although this may vary as suitable, or desired.

In FIGURE 4 the cooling buttons 100 are similar to the cooling buttons 42 and 46 as previously described, and are similarly applied to the evaporator tube 102, except that the buttons 100 are of oval or oblong form, i.e., higher than broad. This reduces the possibility of adjacent ice members joining each other laterally, or horizontally about the space between the walls 10 and 12 of the apparatus.

As shown in FIGURE 2, the outer wall 10 and the inner wall 12 may be joined by generally radially extending pins 104.

In FIGURE 9 the outer wall 106 of the apparatus is of polygonal form providing flat portions 108. The inner wall 109 is also of polygonal form providing flat portions 110, the outer flat sides of which face the inner flat sides of the flat portions 108 of the wall 106 for formation of the ice members or disks between said flat portions 108 and 110 and within the space between the walls 106 and 109.

The evaporator tube 112 surrounds the outer wall 106 and is spaced therefrom as previously described. The inner evaporator tube 114 surrounds the interior of the wall 109. The outer and inner evaporator tubes 112 and 114 may have a plurality of turns or convolutions arranged with respect to the walls 106 and 109 and with respect to each other as previously described. The refrigerant inlet to the evaporator tubes 112 and 114 is shown at 116 and is as previously described. The outlet from the evaporator tubes 112 and 114 is shown at 118 and is also as previously described.

The outer cooling buttons 120 are fixed on the outer evaporator tube 112 and are as previously described, except that the inner ends of the buttons 120 are flat for engagement with the outer sides of the flat portions 108 of the wall 106. The inner cooling buttons 122 are fixed on the inner evaporator tube 114 and are as previously described, except that the outer ends of the buttons 122 are flat for engagement with the inner sides of the flat portions 110 of the wall 109.

The outer cooling buttons 120 are pressed into contact with the outer sides of the flat portions 108 by coiled springs, or by mechanical clamping means, and without attaching the buttons to the flat portions as previously described, and without the disadvantages of attachment of the buttons to the wall 106 as previously pointed out.

The inner cooling buttons 122 are also pressed into contact with the inner sides of the flat portions 110 by coiled springs, or by mechanical clamping means, and without attaching the buttons to the flat portions as previously described, and without the disadvantages of attachment of the buttons to the wall 109 as previously pointed out.

In FIGURE 9 the space between the walls 108 and 109 within which the ice disks or members are formed is indicated at 124. The ice disks or members formed between the flat portions 108 and 110 of the walls 106 and 109 are as shown in FIGURE 5 and described in connection with that figure, except that the ends of the ice disks or members are flat.

With the arrangement of the walls 10 and 12, or the walls 106 and 109 and the evaporator tubes and cooling buttons of the present invention, twice as many ice members may be formed than with the structures previously proposed.

The embodiments of the invention disclosed in the drawings and the specification are for illustrative purposes only, and it is to be expressly understood that said drawings and the specification are not to be construed as a definition of the limits or scope of the invention, reference being had to the appended claims for that purpose.

I claim:

1. Ice member making apparatus comprising an outer generally tubular wall, an inner generally tubular wall spaced inwardly from said outer wall to form a space within which ice members are formed, means for wetting the facing surfaces of said walls, evaporator tube means surrounding the outer surface of said outer wall and the inner surface of said inner wall, cooling members on said evaporator tube means at spaced positions, and means for contracting the evaporator tube means surrounding the outer wall and for expanding the evaporator tube means surrounding the inner wall to press said cooling members against the outer surface of the outer wall and against the inner surface of the inner wall without separate physical attachment of said cooling members to said walls.

2. Ice member making apparatus according to claim 1, wherein the means for pressing the cooling members against at least one of said walls comprises spring means acting to press said cooling members against said wall without separate physical attachment of said cooling members to said wall.

3. Ice member making apparatus according to claim 1, wherein the means for pressing the cooling members against at least one of said walls comprises mechanical clamping means acting to press said cooling members against said wall without separate physical attachment of said cooling members to said wall.

4. Ice member making apparatus according to claim 1, wherein the evaporator tube means has a plurality of turns surrounding the outer surface of the outer wall and a plurality of turns surrounding the inner surface of the inner wall.

5. Ice member making apparatus according to claim 1, wherein there is an inclined screen beneath the space within which the ice members are formed for receiving the ice members as they are released from the inner and outer walls and for directing said ice members from the apparatus.

6. Ice member making apparatus according to claim 1, wherein the inner wall tapers downwardly to a slightly less diameter at its lower end.

7. Ice member making apparatus according to claim 1, wherein the outer and inner walls are of generally polygonal form having flat portions between which the ice members are formed.

8. Ice member making apparatus comprising a pair of spaced walls providing a pair of surfaces facing each other, means for wetting said surfaces, evaporator tube means having cooling buttons cooperating with the other surfaces of said walls for refrigerating a plurality of areas of each of said facing surfaces to cause ice to form on said surfaces at said areas, and means for pressing said cooling buttons against and into contact with the other surfaces of said walls without separate physical attachment of said cooling buttons to said walls, the spaced walls comprising an outer generally tubular polygonal wall having flat portions and an inner generally tubular polygonal wall having flat portions facing the flat portions of the outer wall and spaced inwardly from said outer wall to form a space with flat sides between which the ice members are formed.

9. Ice member making apparatus comprising a pair of spaced walls providing a pair of spaced surfaces facing each other, means for wetting said facing surfaces, evaporator tube means disposed adjacent the other surfaces of said walls, a plurality of cooling buttons fixed on said evaporator tube means, and means for pressing said cooling buttons against and into contact with said other surfaces of said walls without separate physical attachment of said cooling buttons to said walls, said evaporator tube means supplying cooling effect to said cooling buttons and thereby to spaced portions of the wetted surfaces of said walls to form spaced ice members on said wetted surfaces of said walls, the cooling buttons pressed against and into contact with the other surface of one of said walls being aligned with the cooling buttons pressed against and into contact with the other surface of the other wall so that the ice members formed on the wetted surface of one wall join the ice members formed on the wetted surface of the other wall to form unitary thick ice members extending between the wetted surfaces of said walls.

10. Ice member making apparatus comprising a pair of spaced walls of vertical cylindrical form with one of said walls surrounding the other wall and spaced outwardly therefrom providing a pair of surfaces facing each other, means for wetting said facing surfaces, evaporator tube means having a plurality of turns surrounding the outer surface of the outer wall and the inner surface of the inner wall, a plurality of spaced apart cooling buttons fixed on said evaporator tube means, means for pressing said cooling buttons against and into contact with said outer surface of said outer wall and said inner surface of said inner wall without separate physical attachment of said cooling buttons to said walls, said evaporator tube means supplying cooling effect to said cooling buttons and thereby to spaced portions of the wetted surfaces of said walls to form spaced ice members on said wetted surfaces of said walls, and an annular wall of insulation covering the outer surface of said outer wall and the turns of the evaporator tube means surrounding the outer wall and the cooling buttons on said turns.

11. Ice member making apparatus comprising a pair of spaced walls of vertical cylindrical form with one of said walls surrounding the other wall and spaced outwardly therefrom providing a pair of surfaces facing each other, means at the top of the space between said walls for passing water downwardly into the space between said walls for wetting the facing surfaces of said walls, evaporator tube means disposed adjacent the outer surface of the outer wall and the inner surface of the inner wall, a plurality of spaced apart cooling buttons fixed on said evaporator tube means, and means for pressing said cooling buttons against and into contact with said outer surface of said outer wall and said inner surface of said inner wall without separate physical attachment of said cooling buttons to said walls, said evaporator tube means supplying cooling effect to said cooling buttons and thereby to spaced portions of the wetted surfaces of said walls to form spaced ice members on said wetted surfaces of said walls.

References Cited by the Examiner

UNITED STATES PATENTS

| | | | |
|---|---|---|---|
| 1,936,575 | 11/33 | Barrett et al. | 62—67 |
| 2,517,411 | 8/50 | Patterson | 62—518 |
| 2,683,359 | 7/54 | Green | 62—72 X |
| 2,775,096 | 12/56 | Ashley | 62—344 X |
| 2,836,038 | 5/58 | Morgan | 62—344 X |
| 2,940,276 | 6/60 | Loewenthal | 62—344 X |
| 2,963,885 | 12/60 | Loewenthal | 62—344 |
| 2,983,109 | 5/61 | Lesson | 62—344 X |
| 3,146,610 | 9/64 | Lowe | 62—347 |

ROBERT A. O'LEARY, *Primary Examiner.*